United States Patent [19]
Stephenson

[11] Patent Number: 6,098,757
[45] Date of Patent: Aug. 8, 2000

[54] SPRING DRIVE ASSEMBLY

[75] Inventor: Everett H. Stephenson, Savannah, Ga.

[73] Assignee: International Paper Company, Tuxedo, N.Y.

[21] Appl. No.: 09/139,157

[22] Filed: Aug. 25, 1998

[51] Int. Cl.$^7$ .................................................. F03G 1/02
[52] U.S. Cl. .............................. 185/10; 185/43; 185/45; 242/372; 254/364
[58] Field of Search ............................. 185/45, 43, 13, 185/10, 39; 254/364; 242/372

[56] References Cited

U.S. PATENT DOCUMENTS

| 470,611 | 3/1892 | Wood ........................................ 185/45 |
|---|---|---|
| 740,114 | 9/1903 | Fiske ........................................ 185/45 |
| 1,258,158 | 3/1918 | Sims . | |
| 1,581,527 | 4/1926 | Yingling . | |
| 2,481,037 | 9/1949 | Pringle .................................... 254/178 |
| 3,384,321 | 5/1968 | Becker et al. ....................... 242/107.5 |
| 3,804,407 | 4/1974 | Saint ........................................ 185/45 |
| 5,217,208 | 6/1993 | Stephenson ............................ 254/213 |
| 5,590,741 | 1/1997 | Storms ..................................... 185/10 |
| 5,775,619 | 7/1998 | Tabellini ................................. 254/364 |

FOREIGN PATENT DOCUMENTS

| 171962 | 9/1916 | Canada ..................................... 185/10 |
|---|---|---|
| 60-119385 | 6/1985 | Japan . |

Primary Examiner—Katherine A. Matecki
Attorney, Agent, or Firm—Synnestvedt & Lechner LLP

[57] ABSTRACT

A device is disclosed comprising (a) a first and second member in rotational alignment to each another; (b) a torsional resilient mechanism for providing torsional resilience between the first and second members, the torsional resilient mechanism comprising at least two or more coaxial helical springs connected in series with the inner-most spring connected to the first member and the outer-most spring connected to the second member; and (c) one or more stops for preventing at least one of said springs from winding or unwinding beyond a particular point.

18 Claims, 7 Drawing Sheets

SPRING DRIVE ASSEMBLY

FIELD OF INVENTION

The invention relates generally to a spring drive assembly. More specifically, the invention relates to a torsional spring drive assembly for imparting torque and/or storing energy.

BACKGROUND OF THE INVENTION

Spring drive assemblies are known devices that employ resilient means, typically springs, for imparting torque or storing torsional energy. These devices are used in a variety of applications, such as, for example, spring motors (see, for example, U.S. Pat. Nos. 1,258,158, 3,384,321 and 5,590, 741), torsional springs for garage doors (see, for example, U.S. Pat. No. 2,481,037), and winches (see, for example, U.S. Pat. No. 5,217,208). Of particular interest herein, are spring assemblies that employ helical torsional springs (hereinafter "helical springs" or "springs").

A helical spring is a substantially cylindrical body having a particular length, diameter and torsional resilience. It is comprised of axially-aligned, constant-radius turns of a flexible material, such as metal wire or rod, which has a certain radial cross-section or "thickness" and a tension modulus of elasticity. Helical springs may be either left- or right-hand wound. Most helical springs are close-wound springs having a body length equal to the wire thickness multiplied by the number of turns plus one. Each spring has two ends which usually extend tangentially from the last turn on either end. Generally, helical springs are mounted around a shaft or arbor, or inside a "cage," so as to be supported at three or more points. Helical springs function within a relatively small space and the interior space defined by the wire turns may contain shafts, adapters, or other springs.

For purposes of discussion herein, a spring is in a "rest" position when unloaded, and is in a "wound" position when loaded. The degree of deflection or winding is measured by its radial displacement from rest. The rate of energy absorption per increment of radial displacement of a spring is represented by its spring constant. Generally, the greater the spring constant, the stiffer the spring is said to be. One equation for the spring constant (k) of a helical spring is as follows:

$$k = \frac{M}{\theta} = \frac{Ed^4}{10.8DN} \qquad (1)$$

wherein:

M=energy
$\theta$=radial displacement
E=tension modulus of elasticity;
D=mean diameter of the spring body;
d=diameter of the spring wire; and
N=number of turns.

A significant problem with helical springs is fatigue. Generally, helical springs are limited in winding to about 15° per turn of the spring. For example, a spring with ten turns (N=10) is limited to about 150° of winding. Therefore, if more than 150° of winding is needed, additional turns are required to avoid fatigue.

Increasing the number of turns on a helical spring, however, frequently is not practical. As mentioned above, helical springs are used commonly in small spaces, such as in winches, which are unable to accommodate longer springs. Although a thinner spring may be used to increase the number of turns without increasing the length, a decrease in thickness exponentially reduces the spring constant as evidenced by Equation (1). Such an exponential reduction cannot be compensated practically by the other spring parameters. Square springs may be used to increase spring cross sectional area without extending length, but they are expensive and generally considered not commercially viable. Therefore, bending fatigue coupled with limitations in space and spring constants result in compromises between a spring's winding capability and its stiffness.

A need therefore exists for a compact spring drive assembly that provides increased winding capability without sacrificing durability or stiffness. The present invention fulfills this need among others.

SUMMARY OF THE INVENTION

The present invention provides for a spring drive assembly that employs two or more coaxial, helical springs connected in series to increase the assembly's winding capability and/or stiffness without over-stressing the springs. More specifically, the multiple spring configuration improves the assembly's performance by (1) load sharing across the springs, (2) controlling the winding of individual springs, and/or (3) winding the springs sequentially.

The multiple spring design of the assembly of the present invention can be configured to share the torsion load between the springs. Because the load is shared, thinner springs (having lower spring constants) may be used compared to single spring assemblies having similar torsional resistance. Thinner springs allow for more turns in the same amount of space. Consequently, for the same radial displacement, the winding per turn of the thinner spring is less. Less winding per turn translates to less bending fatigue.

In addition to load sharing, the spring drive assembly can be configured to control the winding of individual springs. More specifically, stopping means can be used to prevent winding of a spring beyond a particular radial displacement. This way, the winding of individual springs can be controlled to prevent their over-winding. Since the springs are in series, the overall degree of winding of the spring drive assembly is the sum of the radial deflections of all the springs. In other words, the assembly as a whole can be wound to a greater degree than any one of its springs.

Furthermore, the assembly can be configured to wind the springs sequentially to provide a torque profile. As used herein, a "torque profile" refers to the torsional resistance across the assembly as a function of the assembly's radial displacement. A torque profile is formed by using springs of varying spring constants and stopping means to limit the winding of individual springs. In this configuration, a spring having the lowest spring constant would wind initially. Once this spring is restricted from winding by the stopping means or its spring constant increases to that of the next lowest spring constant, then the spring having the next lowest spring constant would begin to wind. Thus, a torque profile results where the torque is greatest when the assembly is fully wound, and decreases as the assembly returns to its rest or relaxed position.

In a preferred embodiment, the device comprises (a) a first and second member in rotational alignment to each another, wherein "rotationally-aligned" broadly refers to one member's capability of being rotated relative to the other member around a common axis; (b) torsional resilient means for providing torsional resilience between said first and second members, said torsional resilient means comprising at least two or more coaxial helical springs connected in series with the inner-most spring connected to said first member and the outer-most spring connected to said second member; and (c) stopping means for preventing at least one of said springs from winding beyond a particular radial displacement.

The present invention also provides for devices that incorporate the spring drive assembly described above. The spring drive assembly can be used generally in any device requiring the ability to impart, store or absorb rotational energy. For example, the spring drive assembly may be used in the winch mechanism described in U.S. Pat. No. 5,217,208 issued to the Applicant.

In a preferred embodiment, the device is a winch comprising: (a) a frame comprising at least two substantially parallel spaced side plates, each of said side plates having means for receiving a shaft; (b) a shaft having a first end and a second end and being operatively connected to said restraining means such that rotating said shaft manipulates said restraining means, said shaft extending through opposing means for receiving a shaft; (c) first and second adapter means for receiving means for applying torque, said first adapter means being mounted on said first end of said shaft, said second adapter means being rotatably mounted on said second end of said shaft; (d) torsional resilient means for providing torsional resilience between said second adapter and said shaft, said torsional resilient means comprising at least two or more coaxial helical springs connected in series, wherein the inner-most spring is connected to said second adapter and the outer-most spring is operatively connected to said shaft; (e) stopping means for preventing winding or unwinding of one or more springs; (f) first ratchet means for allowing said first adapter means to rotate relative to said frame freely in a first direction but not in a second direction, wherein rotating said first adapter in said first direction withdraws said restraining means; and (g) second ratchet means for allowing said second adapter means to rotate relative to said frame freely in said first direction but not in said second direction, wherein rotating said second adapter in said first direction displaces said resilient means such that said resilient means urges said shaft in said first direction.

Still other features, advantages, and uses of the invention will be apparent to those skilled in the art upon consideration of the following description of the invention.

BRIEF DESCRIPTION OF THE DRAWINGS

The invention may best be understood by reference to the following description taken in conjunction with the accompanying drawings, wherein like reference numerals identify like elements, and wherein.

DETAILED DESCRIPTION OF PREFERRED EMBODIMENTS

In a preferred embodiment, the present invention provides for a spring drive assembly device comprising (a) first and second members rotationally related to one another; (b) torsional resilient means for providing torsional resilience between the first and second members by connecting the first and second members with two or more torsional helical springs linked in series; and (c) stopping means for preventing at least one of said spring from winding or unwinding beyond a particular radial displacement. The device may also comprise (d) optional transmission means for increasing the turn ratio between said first member and said second member.

These elements are described below in greater detail and in regard to more preferred and alternative embodiments. Reference is made to FIGS. 1–6, for illustrative purposes, however, the present invention is not limited to the embodiments depicted therein. Additionally, it should be noted that the variations among the elements as discussed herein can be interchanged to form numerous permutations of the device. The detailed description below also addresses preferred devices which incorporate the spring drive assembly of the present invention, particularly a constant tension take-up winch.

a. First and Second Members

The first and second members serve as the ultimate purchase points for the series of springs. Consequently, the torsional force created by the resilient means is applied across the members. The configuration of the first and second members is defined largely by the application of the device. For example, if the device is used as a torsional coupling between two rotating shafts, then the first and second members should be adapted to receive the shafts. Alternatively, the first and second members could be integral to the shafts. Other configurations include, for example, mounting the first and second members on a common shaft wherein at least one of the members is rotatably mounted thereon, or rotatably mounting one member coaxially on the other member.

Figure 1A:
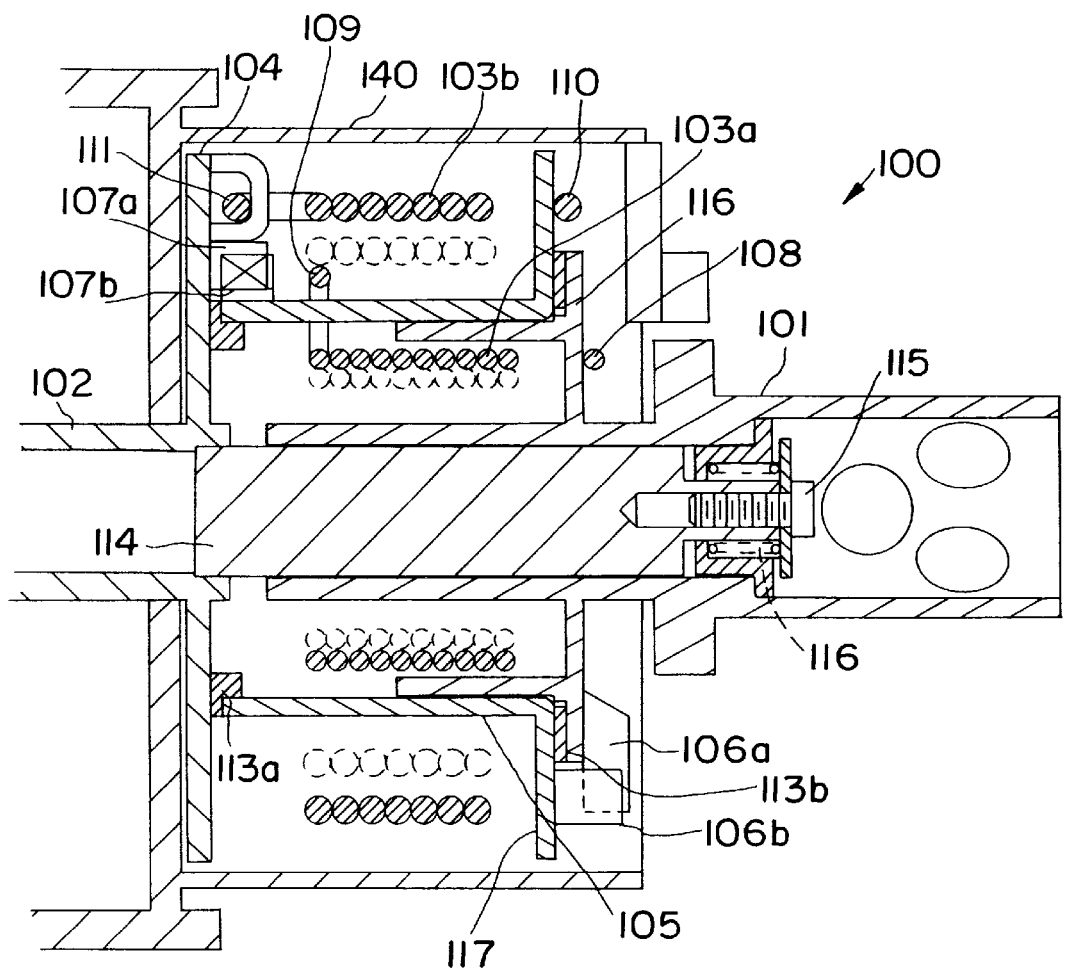
FIG. 1a shows a longitudinal, cross-sectional view of a preferred embodiment of the spring drive assembly device of the present invention having two springs and a particular configuration of cooperating stops.

Referring to FIG. 1a, one preferred embodiment of the device 100 is shown. The device 100 has a first member 101 and a second member 102 rotationally aligned with one another. To maintain this alignment, this embodiment employs a shaft 114 to which at least the first member is rotatably mounted. The first member is connected to the shaft 114 with fastener 115 and a bearing 116, allowing it to rotate relatively easily on the shaft. Although a shaft is used in this embodiment to hold the members in rotational alignment, it should be noted that such means is not necessary and alignment may be maintained by other means extrinsic to the device; for example, each shaft may be held in alignment and supported by bearings, by a separate housing or by the resilient means alone.

Figure 2A:
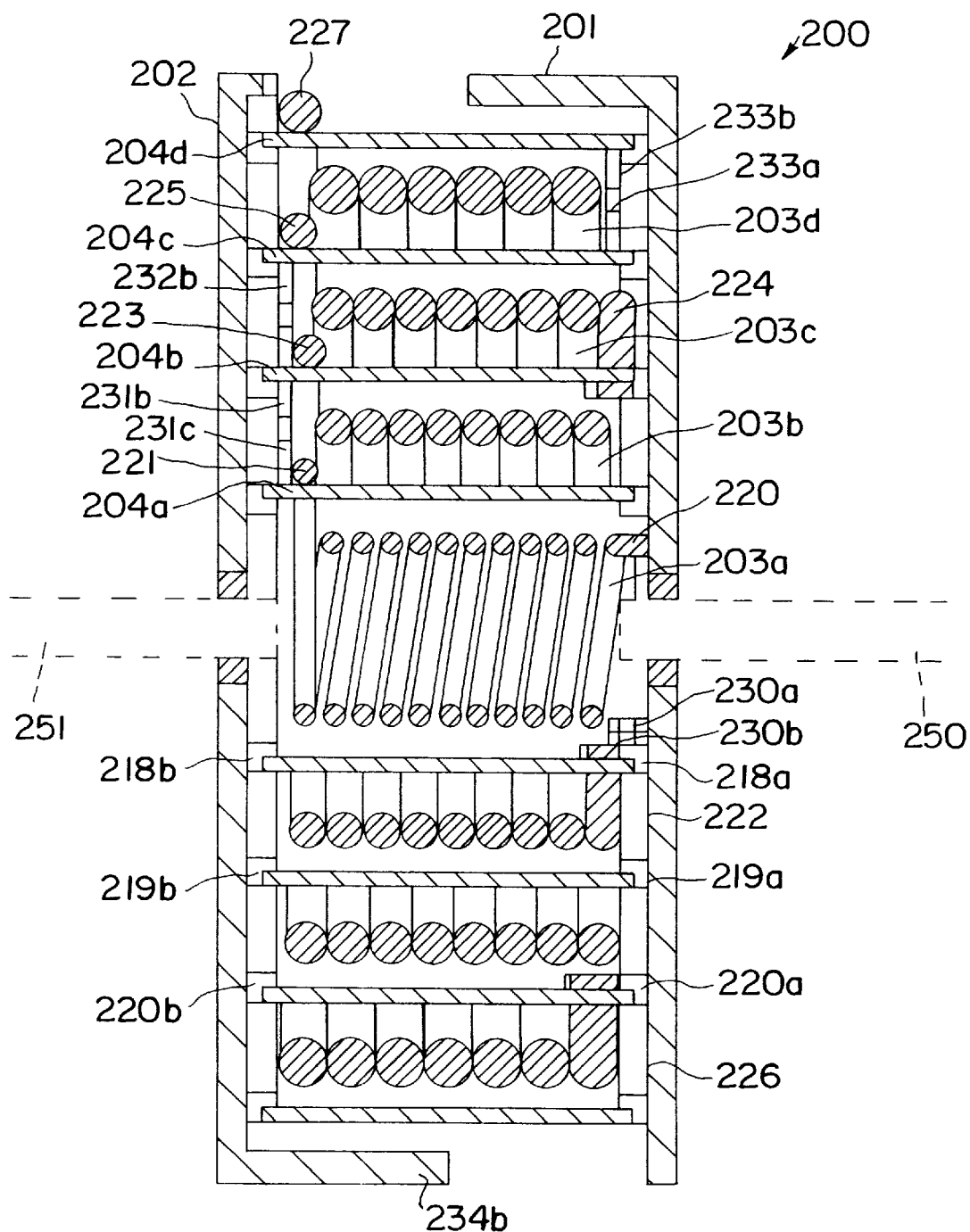
FIG. 2a shows a longitudinal, cross-sectional view of another preferred embodiment of the spring drive assembly device of the present invention having four springs.

Referring to FIG. 2a, an alternative embodiment of the device 200 is shown. The device 200 has a first member 201 and a second member 202 adapted to receive rotating shafts 250 and 251, respectively. The members are rigidly mounted to the shafts such that they are held in rotational alignment by them. The means in which the members rigidly mount to the shafts are well known in the art and include, for example, bushings and set screws.

b. Torsional Resilient Means

The first and second members are connected by torsional resilient means. In a preferred embodiment, the torsional resilient means comprises two or more coaxial helical springs connected in series wherein one end of an inner-most spring is connected to the first member and one end of an outer-most spring connected to the second member. Such helical springs are well-known in the art and are commercially available in a variety of lengths and spring constants. As discussed below, spring constants can be selected and stopping means can be configured to produce any number of torque profiles as the first member rotates in relation to the second member. It is preferred that consecutive springs alternate in winding direction such that non-torsion forces (for example, shear force) are minimized.

Consecutive coaxial springs are connected in series by connection means. In a preferred embodiment, the connection means comprises a coupling between every two consecutive springs. Every pair of consecutive springs has an inner spring and an outer spring. For example, a spring drive assembly having three coaxial springs has two pairs of consecutive springs: the first pair comprises the inner-most spring (inner-consecutive spring) and the middle spring (outer-consecutive spring); and the second pair comprises the middle spring (inner-consecutive spring) and the outer-most spring (outer-consecutive spring). The number of pairs of consecutive springs therefore equals the number of springs minus one. The coupling is disposed between each pair. It connects one end of the inner-consecutive spring to one end of the outer-consecutive spring such that the inner and outer springs are connected in series. Since a coupling is located between each pair of consecutive coaxial springs, the number of couplings equals the number of pairs of consecutive springs.

In a more preferred embodiment, the coupling comprises a substantially cylindrical hub coaxially disposed between consecutive springs and rotationally independent from the first and second members and from any other connection means. The cylindrical hub's inside diameter should be large enough to envelop the inner-consecutive spring while the outside diameter should be small enough to be enveloped by the outer-consecutive spring. Additionally, the cylindrical hub should have adequate strength to join the two consecutive coaxial springs; particularly, the cylindrical hub should be sufficiently rigid to withstand the resultant torsional stress exerted on it by the two consecutive springs. Suitable cylinder hub configurations include, for example, a solid cylinder or a squirrel-cage cylinder. The hub can be an integral unit or it can be comprised of discrete parts. Constructing a cylindrical hub having such structural requirements is known.

To facilitate independent rotation of the couplings, a variety of conventional configurations for rotationally mounting them may be used. These configuration preferably involve the use of one or more bearings to ensure smooth rotational movement. Such bearings are known in the art.

Referring back to the drawings, in FIG. 1a, there is depicted two coaxial springs, an inner-most spring 103a and an outer-most spring 103b. A first end 108 of the inner-most coaxial spring 103a is secured to the first member 101 and a second end 111 of the outer-most coaxial spring 103b is secured to the second member 102. More specifically, the first and second members 101, 102 have radially extending extension members 116, 104 respectively adapted for connection to the first and second ends 108, 111, respectively. The radially extending members 116 and 104 in this embodiment are perpendicular flanges which run along the periphery of the first and second members.

A second end 109 of the inner-most spring 103a and a first end 110 of the outer-most spring 103b are connected to the connection means. In this embodiment, the connection means is a cylindrical hub 105 having an extension member 117 extending radially therefrom. The extension member is flange-like and is substantially perpendicular to the cylindrical hub 105 along the periphery of the hub's end.

In this embodiment, the connection means 105 rides on bearings. One bearing 113b is disposed between the connection means 105 and the extension member 116 of the first member 101, and another bearing 113a is disposed between the cylindrical hub 105 and the extension member 104 of the second member 102. Thus, in this embodiment, the extension members 116, 104 not only provide purchase points for connecting the inner-most and outer-most spring, respectively, but also provide support for the cylindrical hub 105.

Although FIG. 1 shows just two coaxial helical springs, it should be noted that any number of coaxial springs are possible. For example, in FIG. 2a, a longitudinal cross-section of a device having a series of four coaxial springs 203a–d is depicted. In this embodiment, the first end 220 of the inner-most spring 203a is connected to a first member 201, and the second end 227 of the outer-most spring 203d is connected to the second member 202. The connection means 204a–c connect consecutive coaxial springs 203a–d. More specifically, a second end 221 of the inner-most spring 203a and a first end 222 of the next successive spring 203b are connected to connection means 204a; a second end 223 of spring 203b and a first end 224 of the next successive spring 203c are connected to connection means 204b; and finally, a second end 225 of spring 203c and a first end 226 of the outer-most spring 203d are connected to connection means 204c.

In this embodiment, each of the three connection means is a simple cylinder riding on bearings mounted to the first and second members 201, 202. More specifically, the first connection means 204a is supported by ring bearings 218a and 218b, the second connection means 204b is supported by ring bearings 219a and 219b, and the third connection means 204c is supported by ring bearings 220a and 220b. The first ends 220, 222, and 224 and 226 of the springs are slightly modified from the helix pattern of the spring to attach to connecting means 204a, 204b, and 204c respectively.

c. Stopping Means

The particular sequence and degree of spring winding is determined by the spring constants of the springs and by the stopping means. Stopping means prevents at least one spring from winding or unwinding beyond a particular radial displacement. In a preferred embodiment, the stopping means comprises cooperating stops which are configured to meet once a spring winds to a particular point and thereby prevent the spring from winding beyond that point. The stops may be configured in a variety of ways, for example, they may be mounted to the first and second members, to the connection means or to a combination of the two, providing that at least one cooperating stop is mounted to a rotating component of the spring drive assembly. Furthermore, one or more of the stops may be removably attached, for example, by a threaded fastener. This facilitates assembly of spring and components as well as "preloading" of the spring as described below.

In many applications, it is desirable to "preload" springs to take up slack in the assembly rather than to allow them to relax completely when at rest. To this end, during assembly, one or more springs can be wound slightly and a removable stop can be used to prevent unwinding to a completely relaxed state. The placement of the cooperating stops determines the maximum winding of one or more springs, and consequently, the maximum winding of the spring drive assembly. In one embodiment, the winding of a spring is limited to slightly less than one rotation by mounting a stop on a component of the assembly to which one end of the spring connects, and by mounting a cooperating stop on another component to which the other end of the spring attaches. As should be apparent from the description above, the components may be connection means and/or the rotationally-aligned members. Rotating one component in relation to the other component will eventually cause the cooperating stops to meet, at which point, further rotation in the same direction is prevented. Since the spring is connected between the two components, once their relative rotation is stopped, so is the winding of the spring. The sequence in which various springs wind and reach their maximum depends upon their spring constants as described below.

Aside from preventing the over-winding of one or more particular springs, cooperating stops may be used to limit the rotation of the first and second members directly. That is, cooperating stops may be mounted on the rotational members such that their rotation relative to one another is slightly less than one revolution. The amount of winding each spring undergoes in this embodiment is dependent upon its spring constant as described below.

The sequence and degree to which the springs are wound depends upon their spring constants, cooperating stops, or a combination of the two. Absent the effect of cooperating stops, springs with lower spring constants will wind prior to those having higher spring constants. A lower spring-constant spring will wind until either cooperating stops meet, or its resistance to further winding increases such that it substantially equals that of another relaxed spring with a higher sprint constant. In the latter situations, the two springs will wind simultaneously. Therefore, the sequence in which springs wind is determined by their spring constants, but their ultimate winding is determined by the configuration of the cooperating stops.

Spring constants may be selected and cooperating stops may be configured to provide the spring drive assembly with a torque profile. The spring drive assembly of the present invention provides for a linear or a "stepped" torque profile. For a linear torque profile, it is preferable to use springs having substantially similar spring constants such that they are similarly stressed when the device reaches its full radial displacement. Conversely, for a "stepped" torque profile, springs with different spring constants are used. When springs of varying constants are used, the "softest" spring winds first until stopping means prevent its further winding, then, the next softest spring begins to wind. This way, the springs wind from softest to stiffest. Such a configuration results in an increasing torque profile.

Referring to the drawings in FIG. 1a, a set of cooperating stops, 106a, 106b, are mounted on the extension members 116, 117, respectively. The maximum winding of the innermost spring 103a depends upon the radial orientation of these stops. For example, maximum winding is achieved when the stops are oriented almost 360° apart when the spring assembly is not loaded, meaning the spring must wind almost one full revolution before the stops meet. Accordingly, maximum winding can be reduced by reducing this angle.

The winding of the outer-most spring 103b can be controlled by the placement of cooperating stops 107a, 107b on extension member 104 and the cylindrical 105. These stops also limit the winding of the outer most spring 103b to just short of one revolution. Therefore, with the configuration of stops 106a and 106b, and 107a and 107b, the maximum rotation between the first and second members is just short of two revolutions before both sets of stops meet. As mentioned before, the degree of winding can be reduced by decreasing the angle between the cooperating stops when the spring assembly is unloaded.

Figure 1B:
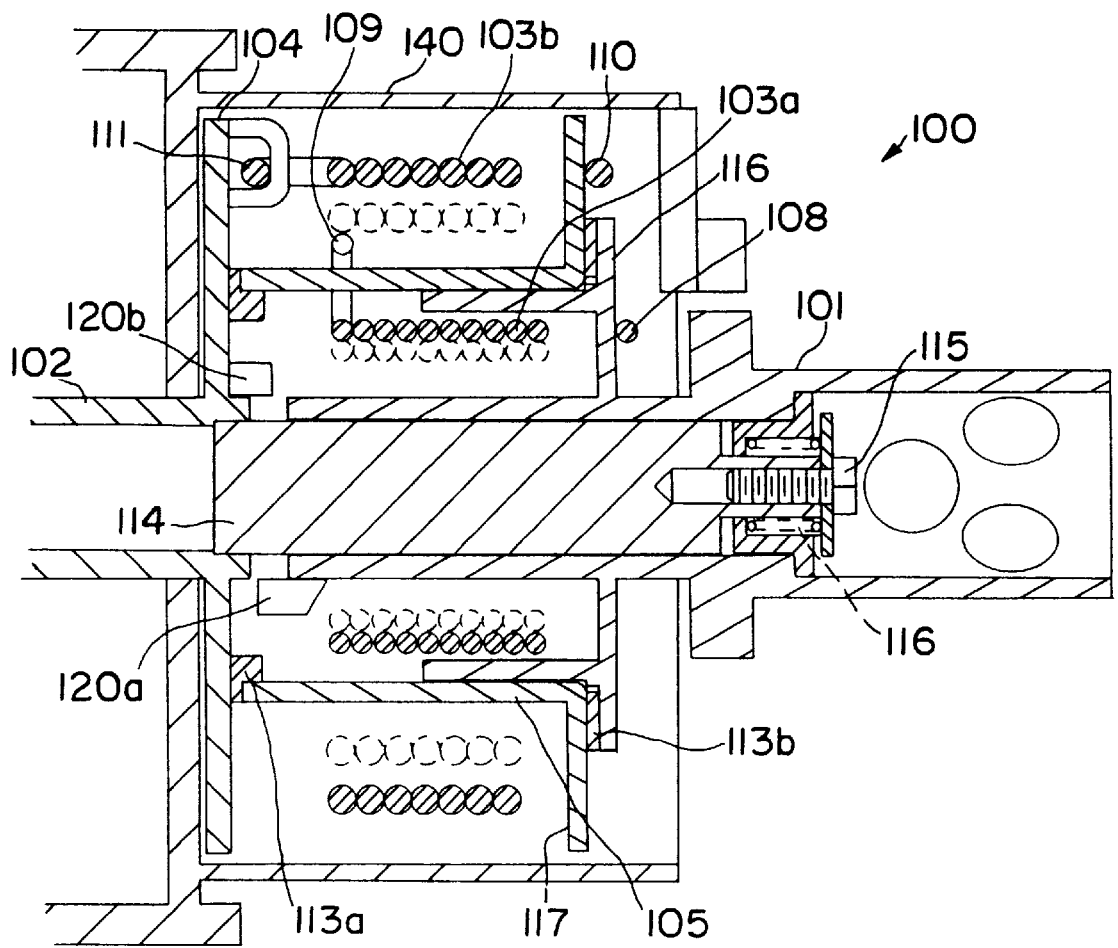
FIG. 1b shows a cross-sectional view of a spring drive similar to that depicted in FIG. 1a except for a different configuration of cooperating stops.

In another embodiment, stops 120a and 120b, (as shown in FIG. 1b) are mounted on the first member 101 and the second member 102, respectively, and cooperate to meet within one revolution of the first member relative to the second member. This way, the total winding of all the springs is limited to less than one rotation. In this embodiment, it is preferred for the springs to have substantially similar spring constants such that their degree of winding is substantially the same.

It should be apparent that the change required for the two stopping means configurations is relatively minor. Consequently, a common spring drive assembly can be configured according to the torque profile desired.

Figure 2B:
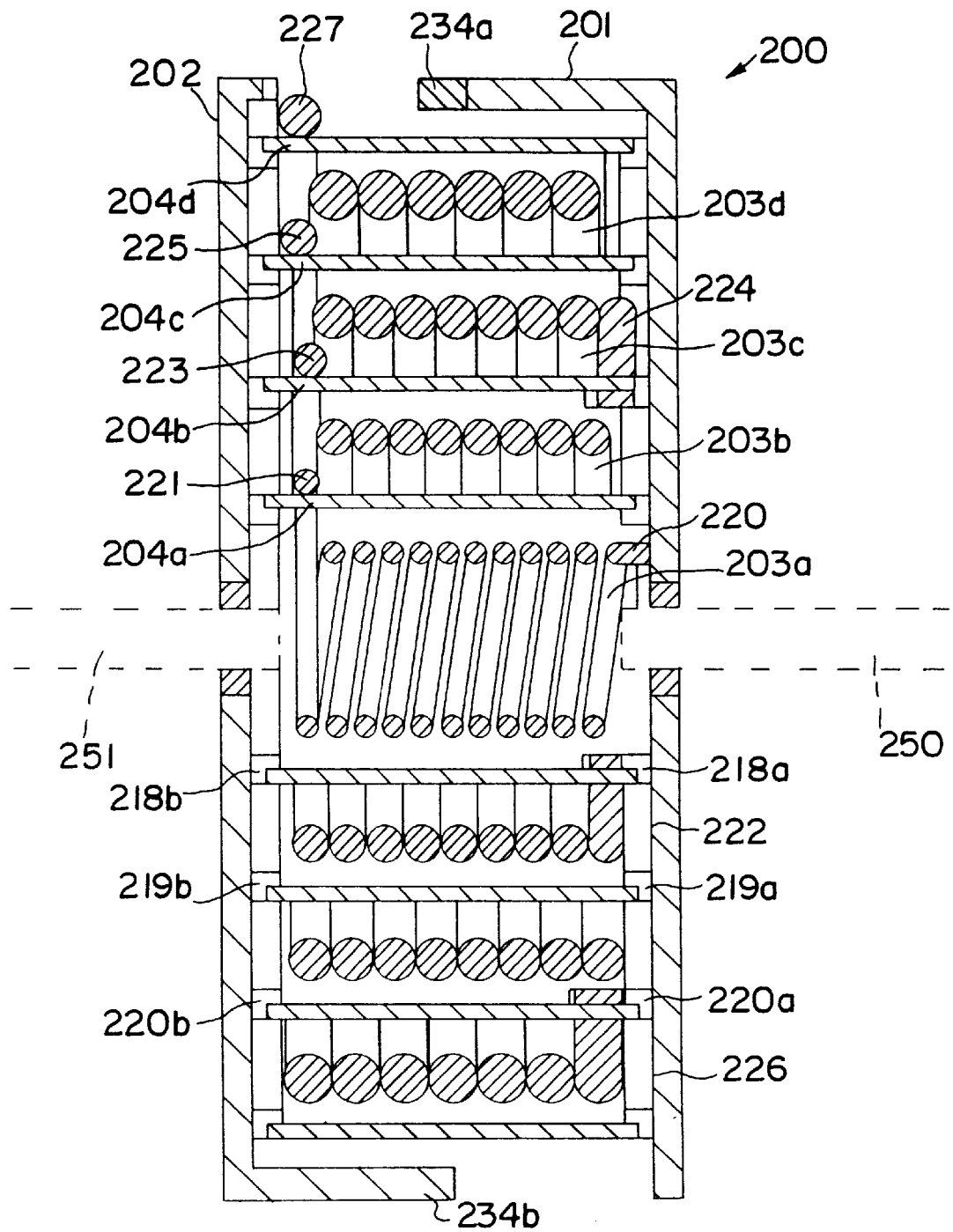
FIG. 2b shows a cross-sectional view of a spring drive similar to that depicted in FIG. 2a except for a different configuration of cooperating stops.

The same principles apply to the embodiment shown in FIG. 2a. There, cooperating stops 230a and 230b are mounted to the first member 201 and the first connection means 204a, respectively, cooperating stops 231a and 231b are mounted to the first and second connection means 204a and 204b, respectively, cooperating stops 232a and 232b are mounted to the second and third connection means 204b and 204c, respectively, and cooperating stops 224a and 224b are mounted to the third connection means 215 and the second member 206, respectively. Stops 230a and 230b, stops 231a and 231b, stops 232a and 232b, and stops 233a and 233b limit the winding of springs 203a–d, respectively, to less than one revolution each to prevent over stressing the springs. Consequently, the device 200 is limited to a maximum rotation of just short of four rotations. As mentioned in the description of embodiment of FIG. 1a, this maximum can be reduced by shortening the radial displacement between the cooperating stops. Moreover, in the situation where it is undesirable to limit the device's rotation and/or one or more of the springs is expendable or is designed to withstand a greater degree of winding, then the stops corresponding to the one or more springs may be removed. Alternatively, the total rotation of the spring drive assembly can be limited to just one revolution by cooperating stops 234a and 234b mounted to the first and second members 201 and 202, respectively, as shown in FIG. 2b.

d. Transmission Means

Figure 3:
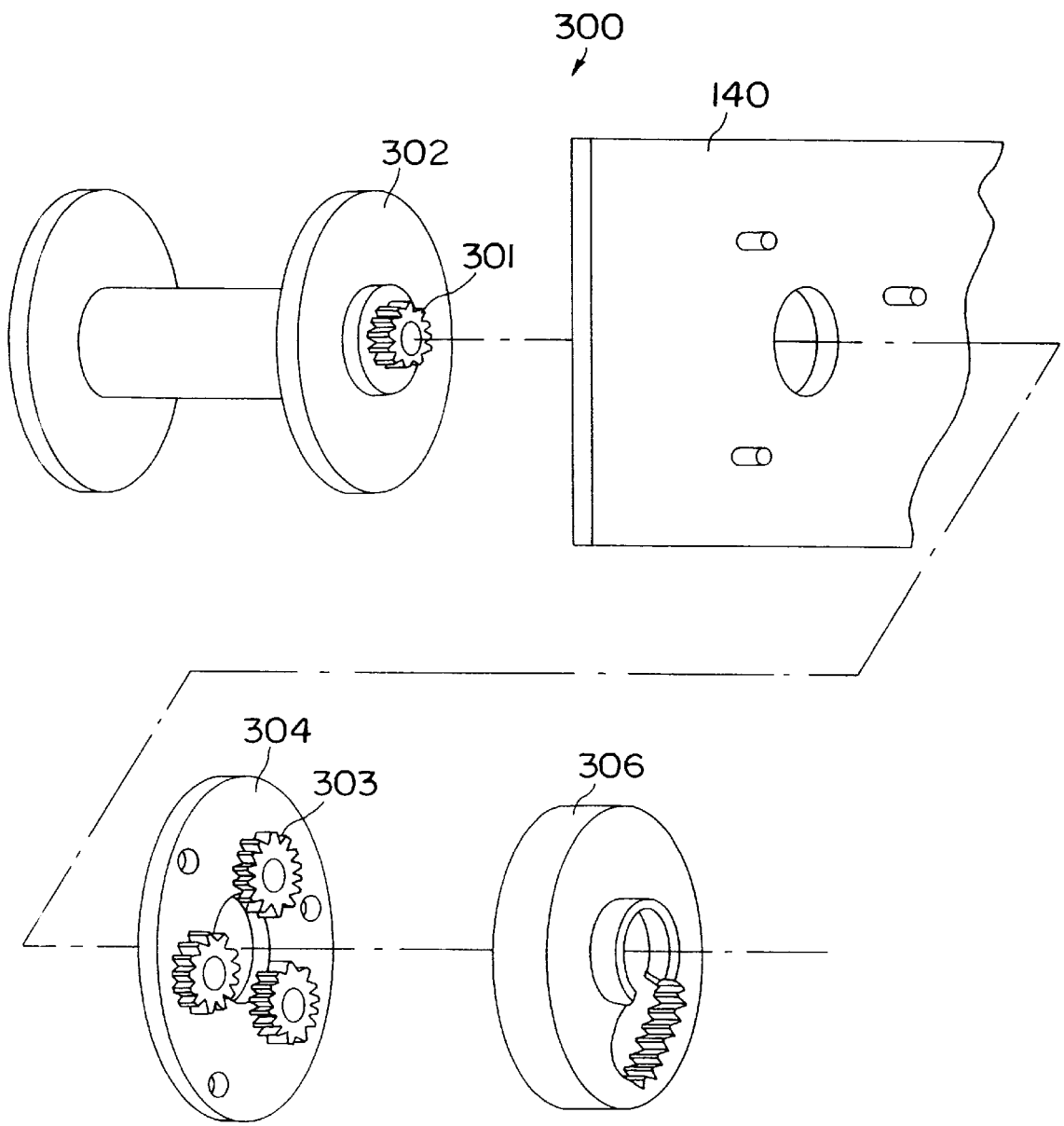
FIG. 3 shows an exploded view of a planetary gear embodiment of the optional transmission means.

An optional transmission or gear train may be employed to increase either the output torque or effective winding of the spring drive assembly. Such transmissions or gear trains include, for example, helical gear reducers, worm gears, and planetary gear systems. Due to its compact configuration and its versatility, planetary gear systems are preferred. A schematic depiction of a planetary gear system incorporated in the spring drive assembly of the present invention is shown in FIG. 3. The planetary gear system comprises a sun gear 301, one or more planet gears 303 which mesh with the sun gear 301, a planet gear carrier 304 to which the planet gears rotatably mount, and a ring gear 306 that circumscribes the planet gears and meshes with them. The gear ratios between the sun, plant and ring gears depend upon their relative circumferences and are easily configurable by someone skilled in the art. Generally, however, there is a speed reduction between the sun gear and the planet carrier and between the planet carrier and the ring gear, with the greatest reduction being between the sun gear and the ring gear.

Such a gear arrangement provides for a variety of input/output ratios depending upon which gears are driven and which gears are held stationary. For example, if the ring gear is driven by the second member and the planet carrier is held stationary (for example, it may be mounted to the frame 140 of the spring drive assembly), then a certain degree of rotation of the ring gear (second member) will result in a greater degree of rotation of the sun gear and, consequently, the load connected to it (for example, a drum 302). It should be understood that if the first member is intended to drive the load then it would drive the sun gear rather than the second member. This arrangement effectively increases the take-up of the spring drive assembly.

Alternatively, rather than increasing the take-up, the planetary gears can be reconfigured to increase the torque of the spring drive assembly. To this end, the sun gear is driven by the second member, the load is connected to the ring gear, and the planet carrier is held stationary.

In yet another configuration, the take-up or torque of the spring drive assembly can be increased but not to the extent as described above. To this end, the ring gear is held stationary, and either the sun gear or the planet carrier is driven while the remaining gear drives the load depending upon the desire for increased torque or take-up.

The versatile nature of planetary gears system allows the output torque or take-up of the spring drive assembly to be tailored to meet an application's specific needs by configuring the interaction of the same basic components. This way, a standard transmission may be kept in stock and configured to a specific user's needs relatively easily.

The spring drive assembly of the present invention is a highly configurable device that enables a user to customize its torque profile and/or its take-up with minor modifications. Such a device can be employed in a variety of applications. The assembly is particularly well-suited for use in a tie-down winch as described in U.S. Pat. No. 5,217,208 issued to the Applicant.

Figure 4:
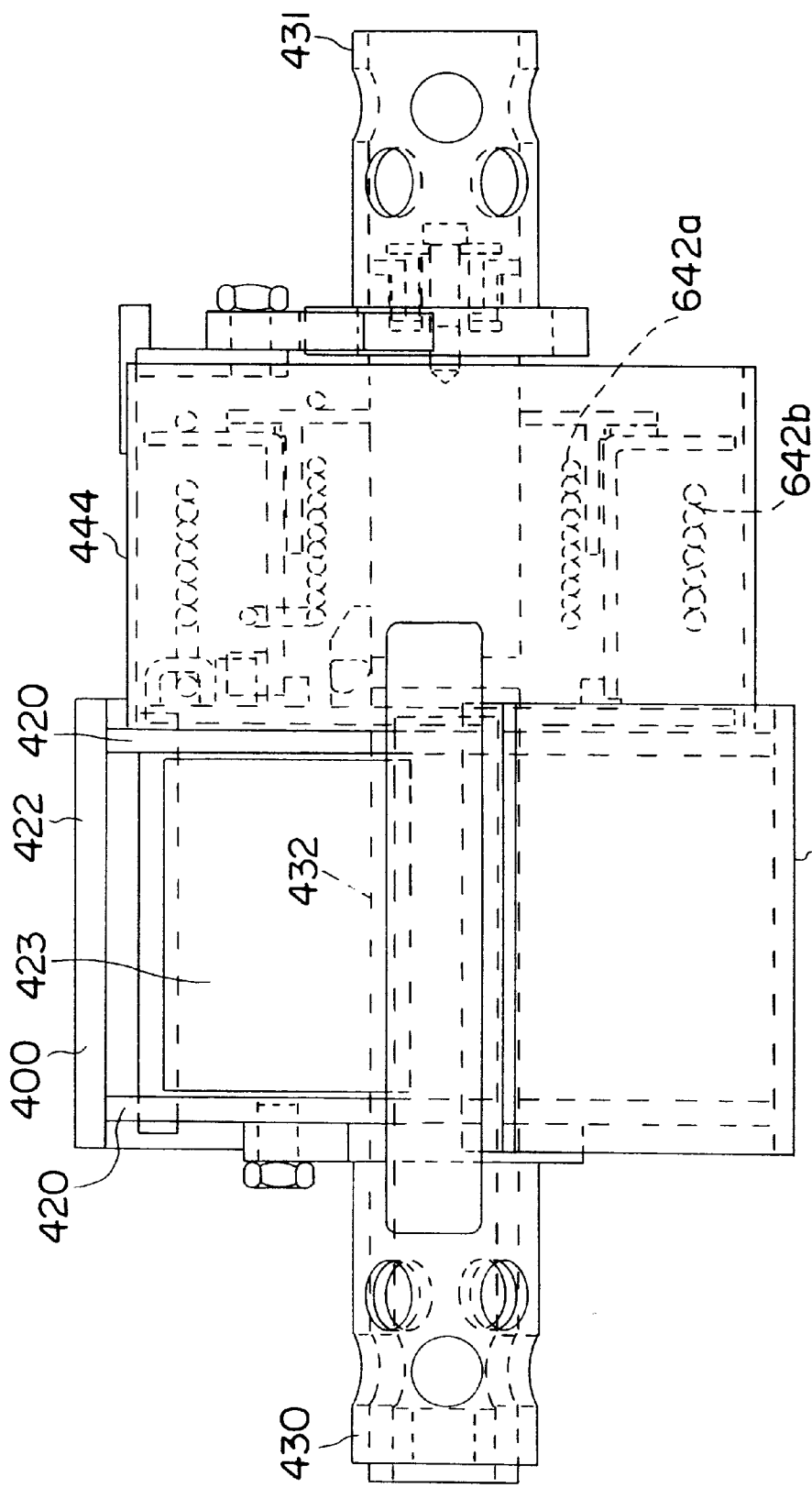
FIG. 4 shows a longitudinal, cross-sectional, front view of a winch incorporating the spring drive assembly depicted in FIG. 1.
Figure 5:
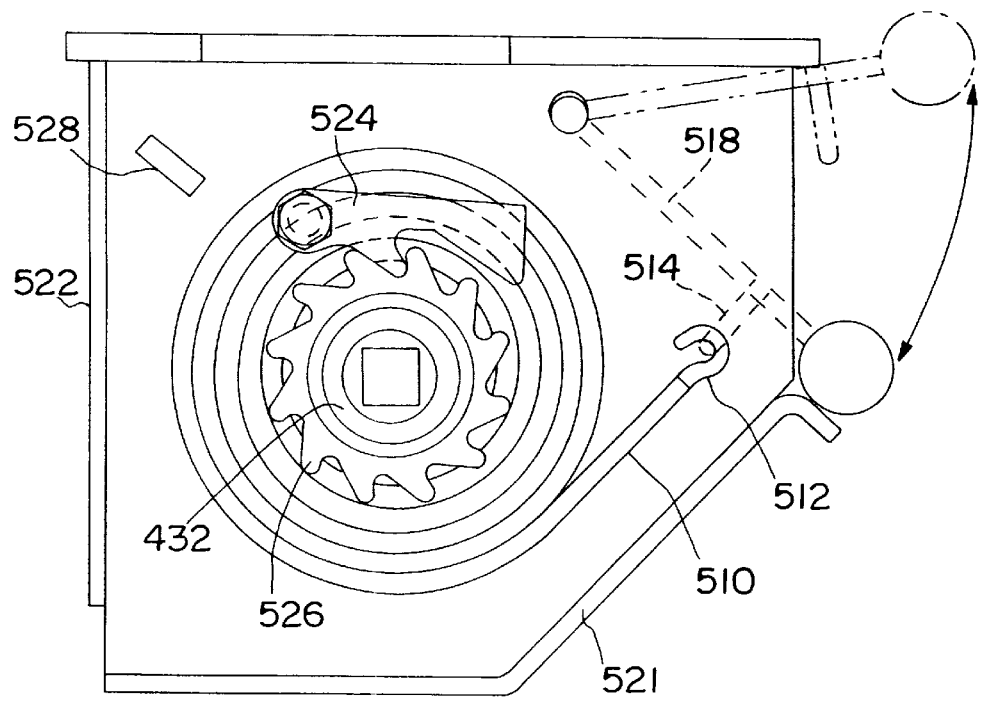
FIG. 5 shows a first ratchet assembly of the winch depicted in FIG. 4.

Referring now to FIG. 4, there is shown a front cross-sectional view of a constant tension winch assembly incorporating the spring drive assembly of the present invention. The winch includes a substantially enclosed casing 400, preferably formed by two parallel side plates 420, which are preferably connected by a top plate 422, a bottom plate 424 also shown in a rear plate 522 (FIG. 5), and a hinged cover plate 423, also 518 (FIG. 5). In certain embodiments, it may be preferred to omit one or more sections of the side or hinged cover plates 420, through 424, and 518 through 524, illustrated in FIGS. 4 and 5. A shaft 432 is placed through the casing 400 and is held between the two parallel side plates 420. Preferably the end of the shaft 432 extends through the side plates 420 and includes a first adaptor means 430 for applying a torque to the shaft 432 and a second adaptor means 431 also provided for applying a torque to the shaft 432. Preferably a spring housing 444 is provided to cover a spring means.

Referring now to FIG. 5 a partially cutaway side elevation view of the winch device is shown depicting the interactive operation of a hinged cover plate 518 having a locking bar 514 attached thereto, means for restraining a load 510, first ratchet 526 and first pawl 524. The restraining means 510 may be a strap as is illustrated. Other restraining means 510 which might be substituted include cable, rope, chain, and numerous other restraining means familiar to those of ordinary skill. The restraining means 510 is preferably terminated with a hook 512 which cooperates with a mating portion (not illustrated) to affix the distal end of the restraining means 510 to a structure or to an object such as the bed of a rail-car or a flat bed trailer. Alternatively, the hook, clasp or other means 512 for attaching the restraining means 510 to an object may be eliminated entirely in certain embodiments and the restraining means 510 attached by tying a knot, or inserting a pin through a loop.

The restraining means is wound around a shaft 432 (not fully visible in this view), which permits the length of the restraining means 510 to be adjusted to accommodate a particular load. Additionally, the shaft 432 functions to manipulate and control the length of the restraining means 510.

The withdrawal and regulation of the restraining means is governed by the first ratchet 526 and first pawl 524 which cooperate to regulate the direction of the rotation of the shaft section 432. As illustrated in FIG. 5, the first ratchet 526 and first pawl 524 are arranged such that the restraining means 510 may be wound about the shaft 432 by applying a torque to the adaptor means 430. However, rotation of the shaft in the opposite direction, i.e., withdrawal of the restraining means 510 is resisted by the engagement of the first ratchet 526 with the first pawl 524. In certain embodiments, it may be necessary to provide a spring to urge the pawl 524 into the ratchet wheel 526. If necessary, the pawl 524 may be withdrawn by pivoting it away from engagement with the ratchet wheel, to a position of rest against the pawl stop 528, permitting the shaft 432 to rotate freely in either direction.

In operation, the distal end of the restraining means 510 is passed over the load. The resistance to rotation in this direction provided by the first ratchet 526 and first pawl 524 is removed by disengaging the ratchet from the pawl. The distal end of the restraining means 510 is then fixed to an object, using the clasp 512 or by other means. After the ratchet 526 is engaged with the pawl 524, the restraining means 510 is initially placed in tension to secure the load by applying a torque to the shaft 432, via the torque adaptor means 430, thereby causing a counter rotation of the first ratchet wheel 526. As the ratchet wheel 526 rotates in the direction of increasing tension, interaction with the first pawl 524 prevents counter rotation and the tension from being released. In this initial setting, the restraining means is thus tensioned about the load.

Figure 6:
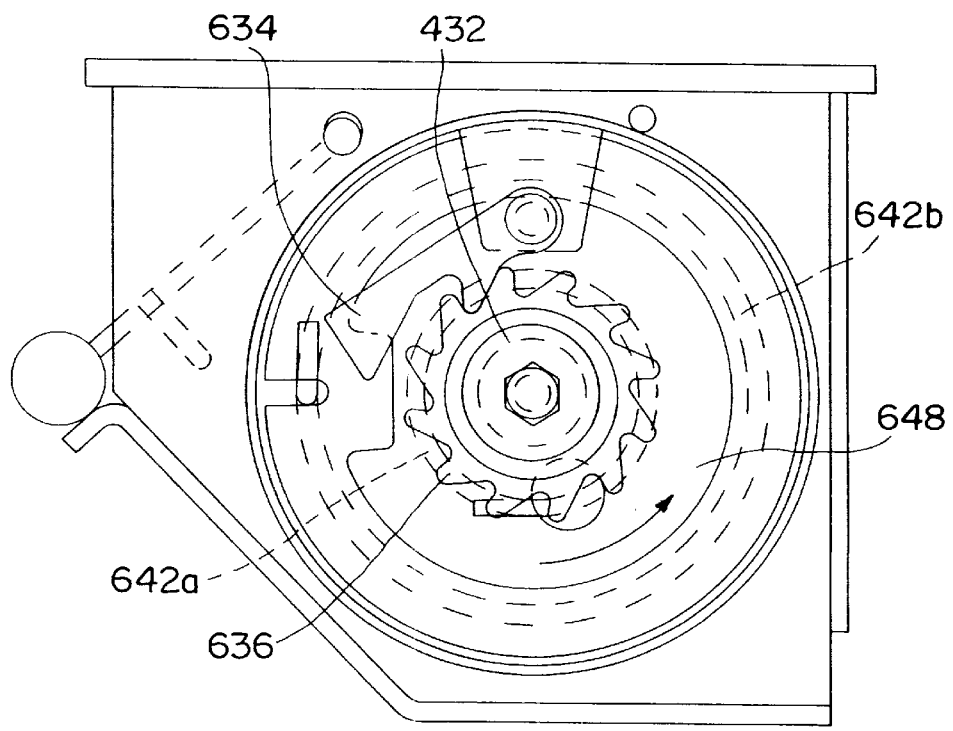
FIG. 6 shows a second ratchet assembly of the winch depicted in FIG. 4.

However, the single ratchet and pawl arrangement described is incapable of retracting and locking in slack, to safely secure a shifting or settling load. To safely secure such a load, an amount of pre-tensioned take-up is required. That is, the tie down winch should be capable of retracting a certain amount of the restraining means under tension. To this end, as shown in FIG. 6, the present invention provides a second ratchet wheel 636 and a second pawl 634 which are both removably affixed to the opposite end of the shaft 432 from the first ratchet 526 and pawl 524 and provide a constant tension which advances the first ratchet wheel in the event the tension in the restraining means 510 decreases. To initially set the tension, a second adaptor means 431 for applying torque to the shaft 432 is also provided. The second ratchet wheel 636, which provides constant tension to the restraining means 510 (not shown in FIG. 6,) is preferably disposed on a spring cover plate 648 in accordance with the present invention.

In a preferred embodiment, two or more springs 642 (partially in phantom) are disposed between the side plate 420 and the second ratchet wheel 636. The springs 642a and 642b provide increasing resistance when the ratchet 636 is advanced in the direction shown by the arrow in FIG. 6. Since the springs 642a and 642b transfer torque to the shaft 432, the tension of the restraining means 510 is maintained. Absent the spring drive assembly, when the load shifts and the initial tension of the restraining means 510 is relaxed, the restraining means 510 will slacken. However, with the spring device assembly the torque stored in the springs 642a and 642b urges against the shaft 432, causing the shaft 432 to rotate to increase the tension upon the restraining means 510 and thereby maintain the load in a secure state. Thus, to use a winch made in accordance with the present invention an operator rotates the second ratchet wheel 636 in the direction shown by the arrow in FIG. 6. The springs 642a and 642b resist this motion; however, counter rotation is prevented by the engagement of the second pawl 634. The ratchet is rotated until a predetermined value of torque, which is related to the desired tension in the restraining means 510, is reached, or until the springs have been wound such that the stopping means prevents further winding. At this point, the first ratchet 526 and pawl 524 are providing the initial tension and the springs 642a and 642b are displaced to provide further force for increasing the tension of the restraining means 510 such that the winch of the present invention will take up any slack created in the restraining means during transit by advancing the first ratchet wheel 526.

The winch described in U.S. Pat. No. 5,217,208, can be easily modified according to the present invention using conventional techniques and components. The process for retrofitting an existing tie-down winch comprises the steps of (a) removing the single spring, hub assembly, and fasteners from the existing winch; and (b) installing two or more new springs, spring holders, hub assemblies for each new spring, and the necessary fasteners and wear plates as known in the art.

Aside from its use in a tie-down winch, the spring drive assembly of the present invention has other applications such as a device for absorbing energy from a rotating shaft or arbor. The device not only can absorb energy through the winding of its springs, but also can release the energy back into the system at a later time. To enhance its energy or shock absorbing capabilities, the device can be configured with a tension profile such that the amount of energy it absorbs per revolution increases. This enhancement is particularly well suited for shock absorbers, where it is preferred to absorb energy at a lower dampening rate at first, but more stiffly, at a higher dampening rate, toward the end of the device's take-up such that all the energy can be absorbed before reaching the end of the device's travel.

For example, it can be used on trains or trolleys to absorb kinetic energy for braking purposes. When the driver chooses to stop or reduce speed, he or she may engage the assembly of the present device to absorb the rotational energy of the vehicle's axial. The force required to wind the springs would slow the vehicle down. If a torque profile is used, the spring drive assembly would absorb energy slowly at first as the "soft" springs with the lower spring constants are wound. This would result in gradual deceleration. Once these "soft" springs wind to their maximum, and the cooperating stops meet, then the next, progressively "stiffer" springs would begin to wind. Such a torque profile would decelerate the vehicle at an increasing rate. To help accelerate the vehicle, the energy stored in the device could be released back into the system. Thus, the device can be used to store energy during braking and release energy during acceleration. Such an innovation reduces energy consumption and brake wear.

In addition to its use as absorbing energy in kinetic systems, the spring drive assembly of the present invention can be used in packing glands and other similar applications where a constant urging force is required. More specifically, the first member of the spring drive assembly can be operatively connected to a conventional packing gland and the second member can be rotated to wind the torsional resilient means and impart a torsional force between the members. A locking mechanism similar to the one described above for the constant-tension, take-up winch can be used to prevent the second member from rotating back to a relaxed position. Accordingly, as the packing gland wears, the constant force being exerted on it by the drive spring assembly will serve to compress it by rotating the first member and thereby keep it tight.

The torque profile offered by the spring drive assembly of the present invention also lends itself to variable torque applications. For example, devices such as large roll-down sectional doors are raised by manual or electromechanical rotary mechanisms. Many such doors are "counterbalanced" by pulleys and weights and/or helical extension springs. The required lifting force is at its maximum when the door begins to open. It is at its minimum when the door is either rolled up or guided into a horizontal overhead track. Therefore, the counterbalance torque requirements are the greatest when the door begins to open and progressively decrease as the door is rolled or otherwise opened. The spring assembly of the present invention is ideal for such a progressive counterbalance. It can exert a large rotational force at first, declining linearly or in steps to lift and store such a roll-down door.

What is claimed is:

1. A spring drive assembly device comprising:
   a first and second member in rotational alignment to each another;
   torsional resilient means for providing torsional resilience between said first and second members, said torsional resilient means having at least two coaxial helical springs, said two or more coaxial helical springs including at least an inner-most coaxial spring and an outer-most coaxial spring, wherein said inner-most spring and said outer-most spring are connected in series and said inner-most spring is also connected to said first member and said outer-most spring is also connected to said second member; and
   stopping means for preventing winding or unwinding of at least one of said springs at a particular radial displacement.

2. The device of claim 1, wherein said torsional resilient means comprises connection means for connecting said springs in series.

3. The device of claim 2, wherein said connection means comprises a coupling between every two consecutive springs, every two consecutive springs having an inner spring and an outer spring, said coupling connecting one end of the inner spring to one end of the outer spring such that said inner and outer springs are connected in series.

4. The device of claim 3, wherein said stopping means comprises two or more cooperating stops, wherein one stop is mounted on said first member and another cooperating stop is mounted on said second member.

5. The device of claim 3, wherein said coupling is a substantially cylindrical hub being coaxial and rotationally independent from said first member.

6. The device of claim 5, wherein said first member has an extension member extending radially outward therefrom, said one end of the inner-most coaxial spring being connected to said extension member and the other end being connected to said cylindrical member; wherein said cylindrical hub has an extension member extending radially therefrom, said extension member being connected to one end of a consecutive outer spring; and wherein said extension member extending radially outward from said first member is adapted for rotatably engaging a portion of said cylindrical hub.

7. The device of claim 5, wherein said first member has an extension member extending radially outward therefrom, said one end of the inner-most coaxial spring being connected to said extension member and the other end being connected to said cylindrical member; wherein said cylindrical hub has an extension member extending radially therefrom, said extension member being connected to one end of a consecutive outer spring; and wherein said extension member extending radially outward from said first member is adapted for rotatably engaging a portion of said cylindrical hub.

8. The device of claim 3, wherein said stopping means comprises two or more cooperating stops, wherein one stop is mounted on an inner-most coupling and another cooperating stop is mounted on said first member.

9. The device of claim 3, wherein said stopping means comprises two or more cooperating stops, wherein one stop is mounted on the outer-most coupling and another cooperating stop is mounted on said second member.

10. The device of claim 3, wherein said torsional resilient means has at least three coaxial helical springs and at least two couplings, and wherein said stopping means comprises two or more cooperating stops, wherein one stop is mounted on a coupling and another cooperating stop is mounted on another coupling.

11. The device of claim 2, wherein said device comprises two springs and said connection means comprises a cylindrical hub disposed between said springs, wherein one end of said inner-most spring is connected to said first member and the another end is connected to said cylindrical hub, and wherein one end of the outer-most spring is connected to the cylindrical hub and the other end is connected to said second member.

12. The device of claim 11, wherein said device has a first and second pair of cooperating stops, the first pair of cooperating stops prevents the radial movement of said cylinder relative to said first member, and the second pair of cooperating stops prevents the radial movement of said cylinder relative to said second member.

13. The device of claim 2, wherein said device has more than two springs.

14. The device of claim 1, further comprising:
 a frame adapted to receive said second member;
 wherein said first member is rotatably and coaxially mounted on at least a portion of said second member.

15. The device of claim 1, further comprising:
 a frame adapted to receive said first member;
 wherein said second member is rotatably mounted on said first member.

16. The device of claim 1, wherein said first and second members are mounted on a common shaft and wherein at least one of them is rotatably mounted thereon.

17. The device of claim 1, further comprising:
 transmission means for increasing or decreasing the rotations between either said first member or said second member and a driven load.

18. The device of claim 17, wherein said transmission means comprises a planetary gear system having a sun gear, one or more planet gears which mesh with said sun gear, a planet gear carrier to which said planet gears rotatably mount, and a ring gear that circumscribes said planet gears and meshes with them; and wherein either said first member or second member is connected to a planetary gear system component selected from the group consisting of said sun gear, said planet carrier, and said ring gear; and wherein said load is connected to another planetary gear system component selected from said group.

* * * * *